United States Patent [19]
Schiesser

[11] 3,991,151
[45] Nov. 9, 1976

[54] METHOD OF SLITTING NON-VULCANIZED RUBBER WEB UPON REMOVAL FROM ROLLING MILL

[75] Inventor: Walter Hugo Schiesser, Zurich, Switzerland

[73] Assignee: Schiesser AG, Zurich, Switzerland

[22] Filed: Apr. 9, 1975

[21] Appl. No.: 566,372

Related U.S. Application Data

[62] Division of Ser. No. 361,836, May 18, 1973, abandoned.

[30] Foreign Application Priority Data

June 14, 1972 Germany ........................... 2228850

[52] U.S. Cl. .................................... 264/146; 83/39; 264/160; 264/175; 264/348

[51] Int. Cl.² ............................................ B29H 3/06

[58] Field of Search ........................... 264/145–147, 264/175, 157, 160, 348, 138, 330; 83/12, 47, 300, 301, 303, 322, 678, 922, 7, 11, 44, 302, 925 R

[56] References Cited

UNITED STATES PATENTS 1,402,160 1/1922 Gwozdz ............................. 264/146
3,268,136 8/1966 Huffman .............................. 83/678
3,495,487 2/1970 Miner .................................. 83/678

*Primary Examiner*—Willard E. Hoag
*Attorney, Agent, or Firm*—Orrin M. Haugen

[57] ABSTRACT

Method for treating bands of heated non-vulcanized rubber for handling upon removal from a rolling mill which includes the formation of a web of material, and the severing of the web along lines parallel to the web axis to form processing strips. The web is initially formed having a width substantially equal to an integral multiple of process strips, and thereafter the web is partially slit longitudinally along a substantial portion only of the length to provide a plurality of strips, each of the strips being coupled together across a transverse header arranged integral with each of the strips for facilitating handling. The technique is particularly adapted for treatment of the heated non-vulcanized rubber prior to the passing of the material through a cooling tunnel preparatory to storage.

3 Claims, 3 Drawing Figures

METHOD OF SLITTING NON-VULCANIZED RUBBER WEB UPON REMOVAL FROM ROLLING MILL

This is a division of application Ser. No. 361,836 filed May 18, 1973, and now abandoned.

BACKGROUND OF THE INVENTION

The present invention relates generally to a process for the fabrication of rubber strips from a non-vulcanized rubber mixture by cut-off of a sectional width of a layer of the rubber mixture which is adherent to the surface of a roller to form a web, and wherein the web is being delivered from the side of a rolling mill or calender at the processing temperature. The process is particularly adapted for treating the web of material as it is being prepared for cooling to ambient temperature by passing through a cooling chamber or apparatus.

At the present time, there are known processes of the general type mentioned above, wherein the cut-off sectional width or web of the rubber mixture layer corresponds to the desired width of the finished strip. This strip width corresponds to only a small fraction of the total axial length of both rollers of the rolling mill so that, because of the very small amount of rubber mixture which is being taken off the mill per unit time, there results a longer mixing time for the mixture than would normally be required for thorough mixing and kneading.

In accordance with another known process, the layer of rubber mixture, as distinguished from the previously mentioned known process, is cut-off at an essentially greater width to form a pressed rubber sheet or web having an overall width corresponding to an intergral multiple of the width of the desired strips. This pressed rubber sheet is then fed as a web into a cooling apparatus, in its full width, and, after having been run through the cooling apparatus, is cut off in its cooled condition transversely to the web direction into strips or strip segments of desired width. In the cutting operation, a separate machine equipped with die punches or circular knife blades is normally used, wherein the cut-off lines do not extend clear across the full width of the pressed rubber sheet, but rather are made along its length at somewhat less than the width of the pressed rubber sheet forming the web. Furthermore, the cuts start alternately from one and then the other edges of the web so that a labyrinth-type pattern is formed.

In separating the structure obtained from such a cutting operation, one accordingly obtains from the pressed rubber sheet, a single contiguous strip, with individual strip sections having a length corresponding to the original length of the web hanging together, end-to-end, in zigzag fashion. However this does not affect the processing that follows, for example, the feeding of the entire strip into an extruder, because any supplementary sections of rubber which may be present at the junction points of the strip sections are evenly distributed. Nevertheless, the division of the pressed rubber sheet or web mentioned, corresponding to the "labyrinth" section also mentioned, requires not only an additional work step or operation, but also a very expensive machine.

A further modification or development of the last-mentioned known process consists in dividing the pressed rubber sheet or web, after cooling, along its lengthwise direction into a plurality of non-connected process strips of desired width, wherein the length of each such strip corresponds to the length of the pressed rubber sheet. A separate machine is used, and the same problems appear here as in the case of the above-mentioned process.

SUMMARY OF THE INVENTION

The purpose of the present invention is to achieve an improved process which, as distinguished from the preceding processes, makes possible the cut off of a sectional width of the layer or rubber mixture (web) from the rolling mill corresponding to the width of a conventionally pressed rubber sheet or web so that mixing time is not rendered excessive. In addition, however, the present invention makes possible the division of the pressed rubber sheet into individual strips on the rolling mill itself without requiring the expense of a separate auxiliary cutting installation. The present invention operates in such manner that immediately following feed of the material into the cooling equipment, no difficulties occur as a result of web handling wherein a possible tangling of the individual strips may result. This is achieved in that the sectional width is adjusted to correspond to a whole multiple or integral multiple of the desired strip width, wherein, after the running through of a relatively short leader portion of width *na*, and accordingly of a pressed rubber sheet or web formed in this manner, a further sectioning of the sheet into *n* strips, each of desired strip width *a*, is carried out. The relatively short leader portion thus formed constitutes a header portion connecting together each of the individual strips thus formed. Following the loading of the cooling apparatus or subsequent processing arrangement, such as for example, an extruder, the previously formed header portion is cut off at right angles to the axis of the web for forming individual process strips.

In accordance with the present invention, therefore, the pressed rubber sheet is divided into strips of the desired width in the rolling mill itself, whereby because of the integral short leader or header portions remaining, the pressed rubber sheet remains intact to the extent that it can be fed into a cooling apparatus or other subsequent processing arrangement without risk of entangling of the individual strips. In this manner, an operator situated at the rolling mill can grip with both hands, the pre-cut width of rubber sheet or web whose width is, for example, 600 mm and feed it directly onto a conveyor which conveys it, for example, to a cooling apparatus for subsequent treatment. If the pressed rubber sheet or web were cut through completely into individual strips, then it would not be possible for a single operator to grasp the numerous individual strips within the short time period available and lay them cleanly or conveniently on the conveyor. Furthermore, processing of the individual strips in the usual type of subsequent cooling apparatus would be most cumbersome. In this case, therefore, it would be possible to cut off from the rolling mill only one individual strip at a time and in this manner, the process would revert to that of the state of the art process described hereinabove. With the process in accordance with the present invention, however, the operator can easily grip the group of strips and lay them or otherwise transfer them onto the conveyor because of the fact that the short, temporary leader or header portions remain.

The short leader or header portion remaining can, after depositing the sheet onto the conveyor feeding into a cooling apparatus, be cut off by a blade cut transverse to the web direction whereby the short leader portion is removed and set aside at that time. However, it has been found to be more advantageous, using a preferred embodiment of the present invention, to cut off the short leader portion only after passing through the cooling apparatus because, in a preferred form of cooling apparatus to be employed, the pressed rubber sheets are laid or drooped in a hairpin fashion over horizontally disposed, continuously moving hold-down bars and subjected to a transverse cooling airstream. This deposit of the strips onto the hold-down bars would be very difficult, if not impossible to achieve without an undesirable tangling of these strips. Furthermore, the cooling airstream could also produce tangling of the strips along with undesired adherance, one to another. Preferably then, the short leader portion of the pressed rubber sheet is removed immediately prior to introduction of these strips into a particular processing station for receiving the strips, for example especially prior to introduction into an extruder.

A further advantage of the process in accordance with the present invention is that the pressed rubber sheets, as distinguished from the present state of the art, can be introduced into a cooling apparatus in multiple lengths after separation into the *n* strips, wherein the pressed rubber sheet can be laid in zigzag fashion onto a number of hold-down bars arranged serially, one behind the other, with the zigzag amplitide corresponding to the usual length of about 1200 mm. On the output side of the cooling apparatus, this over-length pressed rubber sheet can be laid onto a pallet in zigzag layers, with a layer width of 1200 mm, whereby after cut-off of the short leader portion, strips of practically unlimited length are obtained.

Therefore, it is a primary object of the present invention to provide an improved process and apparatus for the treatment of sheets of rubber following delivery from a rolling mill or calender.

It is yet a further object of the present invention to provide an improved apparatus and technique for arranging and disposing rubber sheet as delivered from a rolling mill or calender, and providing for improved handling techniques, particularly for subsequent operations.

Other and further objects of the present invention will become apparent to those skilled in the art upon a study of the following specification, appended claims, and accompanying drawings.

DESCRIPTION OF THE PREFERRED EMBODIMENT

Figure 1:
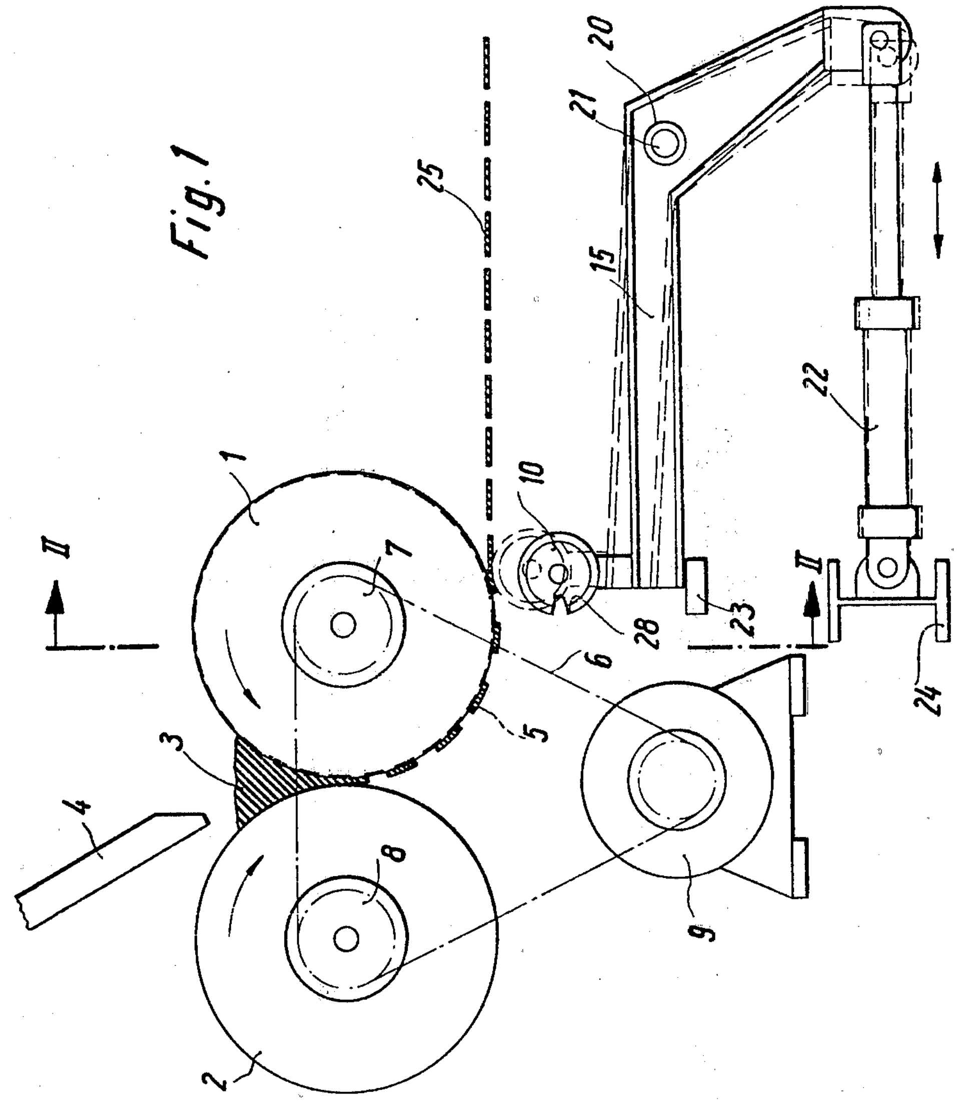
FIG. 1 is a schematic representation of one exemplary embodiment of the invention showing an installation for carrying out the process in accordance with the invention, with the view being along an axis parallel to a rolling mill component utilized in the installation.

In accordance with FIG. 1, a rolling mill is shown which includes a gap-forming, counter-rotating pair of rollers 1 and 2, whose axes lie approximately in a horizontal plan and whose direction of rotation corresponds to the arrows shown within the rollers, with the system corresponding to the direction of motion of a rubber mixture 3 moving downwardly from above. The rubber mixture is delivered from above by means of a conveyor chute 4 into the space or gap formed between rollers 1 and 2. After passing through the roller gap, rubber mixture 3 adheres as a layer or band 5 to the surface of roller 1 which is suited to this purpose, and which is designated hereafter as the coated rotating roller or work-retaining roller. Both rollers 1 and 2 are driven by drive chain 6 represented by a dash-dot line, roller drive wheels 7 and 8 and an electric motor 9 of desired r.p.m. Means, not shown, are provided to the roller drive chain sprocket for obtaining a reverse direction of rotation for rollers 1 and 2 when desired. Below the coated rotating roller 1, as can be seen from the showing of FIG. 1 in conjunction with that of FIG. 2, there is arranged an assembly of circular cutting disks 10, 11, 12 13*a*, 13*b*, 14*a*, 14*b* disposed parallel to the axes of rollers 1 and 2, of which only cutting disk 10 is visible in FIG. 1. Each cutting disk is attached to the lower end of a disk mounting means in the form of an associated toggle lever and, specifically, cutting disk 10 is attached to a toggle lever 15, cutting disk 11 to a toggle lever 16; and cutting disk 12 to a toggle lever 17; cutting disks 13*a* and 13*b* commonly to a toggle lever 18; and cutting disks 14*a* and 14*b* commonly to a toggle lever 19. In the example shown, toggle levers 15–19 are made up of profiled sheet metal and pivotally supported on a common fixed axle shaft 21 through means of bearing bushings 20 provided for this purpose (shown singly in FIG. 1).

Each toggle lever 15–19 is, by means of an associated actuating or positioning member, in the form of a pneumatic piston-cylinder assembly 22, pivotable from an extended position as shown in FIG. 1, where the toggle levers abut upon the surface of a fixed striker block 23, with cutting disks 10–12, 13*a*, 13*b*, 14*a* and 14*b* being removed from the coated rotating roller by about 200 mm, into a second position shown by dotted lines in FIG. 1. This is accomplished by drawing the piston rod of the piston-cylinder assembly 22 into the cylinder, in accordance with the direction of arrow shown running under and near the piston rod. In this position, the cutting disks 10–12, 13*a*, 13*b*, 14*a*, 14*b* for cutting the layer 5 that is retained on coated rotating roller 1, lie against the circumference of the coated rotating roller. For this purpose, all piston-cylinder assemblies 22 (which, for purposes of clarity, are not shown in FIG. 2) are coupled to a common fixed support rail 24 of a machine frame (not shown). The toggle levers 15–19 can be pivoted independently, from one another, through means of the piston-cylinder assemblies 22, as will be explained in detail hereinafter.

Figure 2:
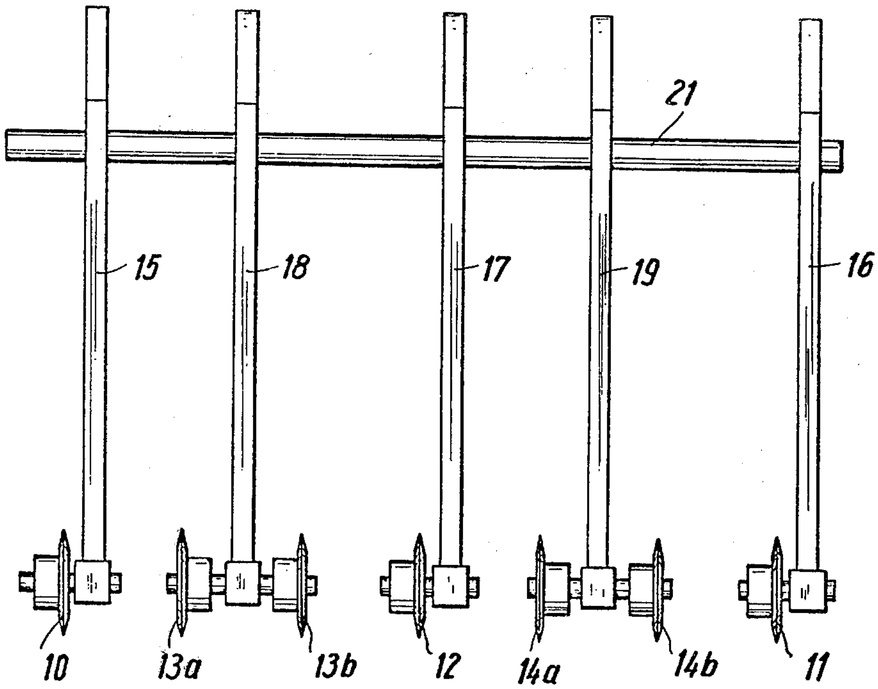
FIG. 2 is a view, on a slightly enlarged scale, taken along the line and in the direction of the arrows 2—2 of FIG. 1, with certain of the components shown in FIG. 1 being omitted for the purposes of clarity.

As can be seen from FIG. 2, cutting disks 10, 13*a*, 13*b*, 12, 14*a*, 14*b*, and 11 are all equidistant from one another. Hereafter, the two outer cutting disks 10 and 11 are designated as outer edge cutting disks or web forming disks because, when bearing against the coated rotating roller 1, they establish or form the side edges as well as the overall width of a pressed rubber sheet or web 25 (heavy dotted line in FIG. 1) that is to be cut off of the coated rotating roller or work-retaining roller, with this width usually being 1200 mm, although the invention is not restricted to or based upon this. In the center, mid-way between the outer edge cutting disks 10 and 11 is a cutting disk 12, hereafter designated the center cutting disk. Arranged between outer edge cutting disk 10 and center cutting disk 12, at equal intervals, are cutting disks 13*a* and 13*b*, hereafter designated as sub-dividing disks or web slitting disks, and arranged between the other edge cutting disk 11 and center cutting disk 12, at equal intervals, are the two cutting disks 14*a* and 14*b* which are hereafter also designated as sub-dividing or web slitting disks. The example of embodiment of FIG. 2 is somewhat simplified, provided as being practical and preferred. Between the outer edge cutting disks 10 and 11 and the center cutting disk 12 are four individual sub-dividing disks instead of the two sub-dividing disks 13*a*, 13*b* and 14*a*, 14*b*. In a preferred form of embodiment, the distance between two adjoining cutting disks is 100 mm, corresponding to the desired width *a* in the strip obtained. It is self-explanatory that, with more or less sub-dividing disks, strip width can be selected and changed as desired.

Figure 3:
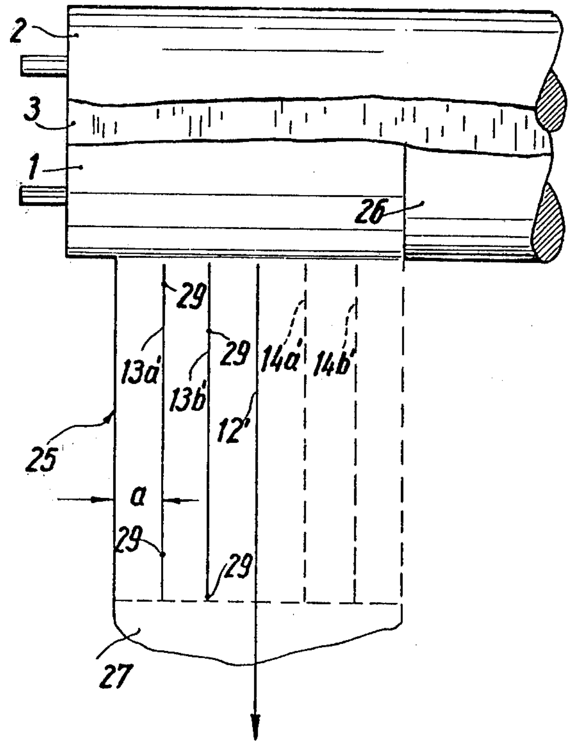
FIG. 3 is a top view of the structure shown in FIG. 1, with certain of the components being removed for purposes of clarity.

In the foregoing case, i.e., the example shown in FIG. 2, a pressed rubber sheet 25, in accordance with FIG. 3, is obtained, from which a total of six strips can be made.

In the following it will be explained in more detail how to carry out a modification of the process that is in accordance with the invention, using the arrangement in accordance with FIGS. 1–3. The rubber mixture 3, intermittently deposited through chute 4 onto rollers 1 and 2 is first kneaded for a period of time on the rotating rollers, during which time all of the cutting disks are raised up off the coated rotating roller 1 (withdrawn position of FIG. 1). After sufficient kneading of the rubber mixture, the pneumatic piston-cylinder assemblies 22 associated to the outer edge cutting disks 10 and 11 are actuated, and these latter-mentioned edge cutting disks 10 and 11 are pressed against the circumference of the coated rotating roller 1 by the retraction of the piston rods of the piston-cylinder assemblies, whereby pressed rubber sheet 25 may be taken off the coated rotating or work-retaining roller 1 (which also includes the portion shown in dotted lines in FIG. 3) and wherein the width of this cut off rubber sheet is less than the axial lengths of rollers 1 and 2, each of which are usually 2100 mm long. A portion 26 of the rubber mixture sheet that is not cut off (width for example, 900 mm) remains adherent to the circumference of the coated rotating roller 1 and is again fed back into the supply of rubber mixture 3 in the roller-gap, where there follows a renewed kneading and mixing.

After a short time delay following actuation of the piston-cylinder assemblies 22 associated with the outer edge cutting disks 10 and 11, all the remaining piston-cylinder assemblies 22 associated with cutting disks 13*a*, 13*b*, 12, 14*a*, 14*b* are put into operation whereby the latter-mentioned cutting disks are pressed against the circumference of coated rotating roller 1, and thereby divide the pressed rubber sheet 25. During the delay portion of the cycle, a short leader portion 27 about 20–30 cm long has been permitted to pass by. Accordingly, the mixture sheet is divided into a total of *n* strips, here six, of a strip-width *a*, by cutting through cut-off lines 13*a*′, 13*b*′, 12′, 14*a*′, 14*b*′. All cutting disks remain pressed against the circumference of coated rotating roller 1 until the entire supply of rubber mixture 3 is used up and taken off in the form of a continuous rubber mixture sheet 25.

This rubber mixture sheet that is sub-divided into six strips can be introduced into a subsequent processing station and, in particular, laid onto a conveyor surface without danger of tangling of the individual strips.

In accordance with a special modification of the arrangement described in FIGS. 1–3, there is provided a control arrangement (not shown) with which it is possible to selectively pivot the outer edge cutting disks 10 and 11, the center cutting disk 12 and both pairs of sub-dividing disks 13*a*, 13*b* and 14*a*, 14*b* individually, against the coated rotating roller 1. Accordingly, the process, in accordance with this modification, can be carried out such that the first outer edge cutting disk 10, in conjunction with the center cutting disk 12, preferably displaying an interval of 600 mm, are moved upwardly against the circumference of coated rotating roller 1 by actuating the corresponding and associated piston-cylinder assemblies 22. In this manner, one obtains a pressed rubber sheet 25 of a width as shown in FIG. 3. Next, after a predetermined time delay, the intermediately lying sub-dividing disks are moved upwardly against the circumference of the coated rotating roller 1 by actuation of the corresponding and associated piston-cylinder assemblies 22, yielding the sub-dividing cutting lines 13*a*′, 13*b*′. This pressed and cut rubber sheet can now be laid onto a conveyor by the operator, by grasping by the short integral leader portions 27 that have been formed, with further cut-off of this pressed rubber sheet occurring of itself. Thereafter, the second outer edge cutting disk 11 is moved upwardly against the circumference of the coated rotating or work-retaining roller 1 by actuation of its associated piston-cylinder assembly 22, whereby, again, the right-hand half of the pressed rubber sheet, shown by dotted lines in FIG. 3, also preferably 600 mm in width, is cut off from the circumference of the coated rotating roller 1. Next, after a predetermined time delay, the sub-dividing disks 14*a* and 14*b* are moved upwardly against the circumference of the coated rotating roller 1, whence are obtained the dotted sub-dividing cutting lines 14*a*′, 14*b*′, with the result, however, that the short leader portions 27 are retained. This makes it possible for the operator to lay this half of the pressed rubber sheet onto the conveyor without tangling of the already sub-divided strips.

In the example just described for the process, the reason why the pressed rubber sheet is cut off of the coated rotating roller 1 in two halves lies in the fact that a pressed rubber sheet 1200 mm wide can be grasped and handled by a single operator only with difficulty, particularly when, right behind the short leader portions 27, a sub-division has already been made along cutting lines 13*a*′, 13*b*′, 12′, 14*a*′, and 14*b*′. The special means for carrying out the process in accordance with the second variation makes it possible for the operator, at the expense of only a small loss of time, to first grasp the one half of the pressed rubber sheet and lay it onto the conveyor, whereupon, without difficulties, the second half of the pressed rubber sheet can be similarly grasped and likewise laid onto the conveyor.

Although in normal cases, i.e. with normal thickness of the pressed rubber sheets 25, tangling of the strips formed by the individual cut-off disks is improbable, in certain cases it may be useful to provide, on the circumference of all cutting disks with the exception of the two outer edge cutting disks 10 and 11 and possibly center cutting disk 12, a radial notch or serration 28. While in FIG. 1, this feature is shown in conjunction with cutting disk 10, because this is the cutting disk shown in side view, though it will be understood that the outer edge cutting disks do not actually require this notch. The notches 28 cause short discontinuities or bridges 29 in the sub-dividing lines 13*a*', 13*b*', 14*a*' and 14*b*', with the interval between bridges corresponding to the circumference of a cutting disk. In this arrangement, the already divided strips still hang together slightly at the discontinuities or bridges 29 in such manner, however, that a simple pulling apart of the material forming the bridge is possible. The discontinuities or bridges 29 are shown in FIG. 3 merely relative to sub-dividing cutting lines 13*a*', 13*b*', it being assumed that, in accordance with a useful embodiment of this concept, the notches of the sub-dividing disks are arcuately offset from one another so as, in this manner, to provide a longitudinal offset in the location of discontinuities or bridges 29.

If the pressed rubber sheet is laid onto a conveyor that follows behind rotating roller 1, either in its total width or in two halves, the short leader portion 27 can be manually cut off by the operator by a rapid, right angle-directed stroke of a knife where, next, the individual strips lie free. Preferably, however, cut-off of the leader 27 occurs only after the pressed rubber sheet has been handled and run through cooling equipment (not shown) and has been laid zigzag fashion onto a pallet or other support surface, either in the form of pieces or in the form of a pressed rubber sheet of very long length. Thus the material laid onto the pallet is ensured to be in strip form for feeding into an extruder.

I claim:

1. In the method of continuously forming a web of heated non-vulcanized rubber on a rolling mill, continuously removing said web from said mill and transversely severing said web to form a process strip therefrom, the improvement comprising:

a. forming said web with a width substantially equal to an integral multiple of process strips; and b. slitting said web longitudinally from an end thereof and along a substantial portion only of the length of said web in plural spaced positions across said web to provide plural, side-by-side strips, terminating said slitting and thereafter transversely severing said web in an unslit portion thereof to provide an unslit transverse header portion of said web integral with one end only of each of said strips for facilitating handling of said strips.

2. The process as defined in claim 1 wherein said process includes the steps of passing said partially slitted web through a cooling station and cooling said web therein, and thereafter separating the header portion of said web from said cooled strip portion.

3. The process as defined in claim 1:

a. wherein a plurality of generally parallelly disposed webs are formed simultaneously, each of said webs having a width substantially equal to an integral multiple of process strips; and b. wherein each of said webs is partially slit longitudinally along a substantial portion only of the length thereof to provide a plurality of strips, each of said strips being coupled together across a web header, said web header being integral with each of said strips for facilitating handling of said strips.

* * * * *